Patented May 23, 1944

2,349,759

UNITED STATES PATENT OFFICE 2,349,759

PLASTIC REACTION PRODUCTS OF CONJUGATED OLEFINS WITH WAX SUBSTITUTED AROMATIC COMPOUNDS

Orland M. Reiff and John D. Zech, Woodbury, N. J., assignors to Socony-Vacuum Oil Company, Incorporated, New York, N. Y., a corporation of New York No Drawing. Application February 25, 1942, Serial No. 432,279

1 Claim. (Cl. 260—61)

This invention is directed to plastic compositions prepared by reacting polyolefins with wax-substituted aromatic compounds.

The invention relates broadly to reaction of olefins having conjugate double bonds with aromatic compounds substituted in the nucleus with alkyl radicals of at least 15 carbon atoms.

Referring generally to the substituted aromatic reactant, it has been found that when the alkyl group contains at least 15 carbon atoms, the resins produced possess a degree of flexibility not present in the prior art resins. Further, it has been found that when the alkyl group comprises hydrocarbons of around 20 carbon atoms or more as, for example, the paraffin waxes, the resin acquires the greatest degree of flexibility. For instance, the resins produced by resinifying hydroxyaromatic compounds or aromatic ethers, which have been previously alkylated with a paraffin wax, possess a flexibility approaching that of rubber, so that in the resinoid state a resinous product is provided which not only is infusible and insoluble, but also is of a rubbery, tough, and highly flexible nature.

As a preferred embodiment, the hydroxyaromatic compounds which may be used in the practice of our invention are phenols: that is, they are aromatic compounds which have at least one hydroxyl group attached directly to a carbon ring and may be either mono- or polynuclear phenols. To more clearly describe the phenols with which this invention is concerned, it may be said that the compounds are of the following general formulae:

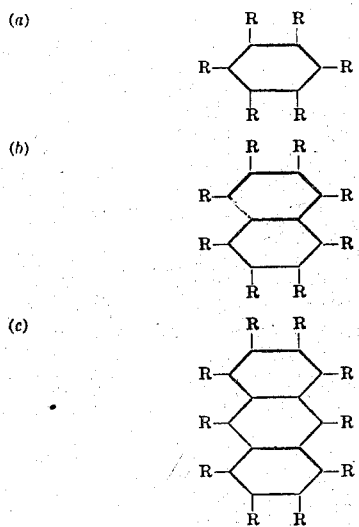

wherein at least one R represents a hydroxy group and the remaining Rs may be selected from the group of radicals comprising hydrogen, hydroxy, alkyl, aryl, aralkyl, alkoxy, or aroxy. As examples of hydroxyaromatic compounds of the group above defined, we may name phenol, resorcinol, hydroquinone, catechol, xylenol, hydroxy-diphenyl, benzyl phenol, phenyl ethyl phenol, methyl hydroxy diphenyl, ethyl hydroxy diphenyl, guaiacol, the monoethylether of catechol, alpha and beta naphthol, alpha and beta methyl naphthol, phenyl naphthol, tolyl naphthol, xylyl naphthol, benzyl naphthol, monomethylether of dihydroxynaphthalene, anthranol, phenyl methyl anthranol, and the like. Of the above-named materials, the preferred classes are the monohydroxy phenols wherein the remaining Rs are hydrogen or alkyl. As to particular compounds, preference is given to the simpler phenols, as phenol and beta naphthol.

The aromatic ethers which may be used in our invention correspond to the phenols in scope, thus, for example, in the above general formulae, viz. (a), (b), and (c), at least one R would represent an ether linkage to the carbon ring. As examples of the aromatic ethers that may be used are anisol (methyl phenyl ether), ethyl phenyl ether, and higher homologues, methyl ether of alpha naphthol, ethyl ether of alpha naphthol, and higher homologues, methyl ether of beta naphthol, ethyl ether of beta naphthol, and higher homologues, hydroxy methyl phenyl ether, diphenyl ether and dinaphthyl ether. Similarly to the hydroxyaromatic compounds the preferred ethers are the simpler compounds, such as anisol, diphenyl ether and alpha or beta naphthol methyl ether.

Similarly, the aromatic hydrocarbons and other derivatives thereof may be employed, although the hydroxy and ether compounds and mixtures thereof are preferred.

The alkyl hydrocarbons with which our invention is concerned may be obtained from any suitable source which will provide alkyl hydrocarbons containing at least 15 carbon atoms, as, for example, petroleum products and the higher alcohols. Particularly suitable sources are any of the petroleum fractions having a mean boiling point about about 500° F., such as heavy oils, for instance gas oil and lubricants, petrolatums and crystalline waxes.

Especial preference for the alkyl radical, however, is given to that group of aliphatic hydrocarbon compounds comprising the crystalline waxes which may be more closely defined as the petroleum waxes having a melting point of 120° F. or higher, or having a molecular weight of about 300 or greater, or having about 20 or more carbon atoms. By use of this preferred class of alkyl compounds, resins are produced by reaction with polyolefins which have a much greater degree of flexibility.

The alkyl compounds and the oxyaromatic compounds, i. e., the phenols and aromatic ethers, of the classes defined above may be condensed together by making use of a Friedel-Crafts reaction with aluminum chloride, in a manner more specifically described hereafter, resulting in the production of alkyl-substituted compounds. It is to be understood that when the Friedel-Crafts reaction is employed, the alkyl compound must be first chlorinated, as is well understood. It is to be noted that when an aromatic ether is alkylated by a Friedel-Crafts reaction, it appears that the aliphatic portion of the ether group is broken away from the ether oxygen atom and effects a rearrangement whereby it attaches to a carbon of the aromatic nucleus. Hence the alkylated product seems to be wholly or largely an alkylated phenol rather than an alkylated aromatic ether. It is also to be understood that the desired alkyl-substituted compounds may be produced by other reactions as, for example, by heating a phenol with a higher alcohol in the presence of a dehydration agent, or the alkyl may be obtained in an unsaturated condition and condensed with a phenol in known manner. These alkyl-substituted compounds may then be reacted with a polyolefin.

As has been indicated hereinbefore, we have found that the properties of the resins which may be produced by reaction of polyolefins with alkyl-substituted aromatic compounds wherein the alkyl group contains at least 15 carbon atoms, are dependent upon certain factors. One of the important factors is the degree or extent of substitution of the alkyl radical in the aromatic nucleus, as determined by the proportion of alkyl chloride (when using the Friedel-Crafts reaction) to aromatic compound. Another important factor is the molecular weight or the number of carbon atoms of the aliphatic hydrocarbon corresponding to the substituted alkyl radical.

The degree or extent of substitution of alkyl radical may be effectively employed in our invention to control the type of resin desired as to hardness. One mol of phenol, for instance, is capable, theoretically, of reacting with 1 to 5 mols of monochlor paraffin. When the substitution is carried out with chlorwax of 18% chlorine content, using a proportion of 1 atomic weight of chlorine per mol of hydroxy-aromatic compound, a more reactive alkyl substituted phenol is obtained which is capable of producing tougher resinoid materials, but less oil-soluble resol or novolak (less resinified) resins with polyolefins than when the phenol molecule is more highly substituted with alkyl radicals. It has been found that when the hydroxyaromatic compound, whether mononuclear or polynuclear, is mono- or di-substituted, an infusible, insoluble resin is produced upon complete reaction with a polyolefin. However, when the hydroxyaromatic compound is tri-substituted, or more highly substituted, it is usually impossible to produce an infusible, insoluble resin by reaction with a polyolefin, but rather a soft resinous material is produced which in the case of the alkyls containing at least 20 carbon atoms is eminently suitable for use as a pour point depressant. It should also be noted that even in the case of mono- and di-substituted phenols (where the alkyl contains at least 20 carbon atoms) a pour point depressant composition can be prepared by lightly reacting with a resinifying agent, rather than heavily or completely reacting, that is by stopping the reaction just before the resinous composition becomes oil-insoluble. The value of the resinous composition as a pour point depressant increases with its viscosity, hence the reaction is carried as far as possible to increase the viscosity, but, as is obvious, must be stopped just short of the point where the composition becomes oil-insoluble.

Changes in the molecular weight of the substituted alkyl can be utilized in accordance with our invention to control the nature and properties of the resulting resinous material and, in particular, its flexibility. For instance, when an alkyl hydrocarbon containing 15 to 19 carbon atoms as, for example, the hydrocarbons of gas oil or lubricating oil, is chlorinated and condensed with a phenol to produce a mono- or di-substituted phenol, the alkylated product may be converted into a fairly hard, non-brittle, infusible, insoluble resin possessing a flexibility which increases with the number of carbon atoms in the alkyl group by reaction with a polyolefin. Moreover, when the alkyl group contains 20 or more carbon atoms, as, for example, the paraffin waxes with the same degree of substitution and a corresponding treatment, the resulting product, while still infusible and insoluble, is not so hard, being much more flexible and rubber-like. Further, it is to be noted that when the resins are produced in a soft form as, for example, results from heavy alkylation, i. e. tri-substituted or more, those resins wherein the alkyl contains 20 carbon atoms or more, possess a remarkable property for exerting a pour point depressant action on mineral oils. Furthermore, the resinous products of our invention may be used in varnishes and as plasticizers in general. When used as plasticizers the resins capable of being converted to the infusible form should be used, as otherwise there will usually tend to be a tackiness in the resultant product. The resins prepared from phenols alkylated with waxes, i. e., hydrocarbons containing at least 20 carbon atoms, are preferred for this use, not only because they give the resultant product a higher degree of flexibility and rubber-like character, but also because such resins are more soluble in vegetable and mineral oils, effecting a better colloidal effect, and, therefore will "stay in" much better.

Referring now to a preferred embodiment of the invention, superior results are obtained when the material reacted with the polyolefin is a rubber-like composition of the type described in our copending application noted above.

In general, these present compositions are highly alkylated aromatic compounds; i. e. containing aliphatic substituents of high molecular weight substituted at more than 1 carbon atom of each of the greater proportion of the aromatic nuclei. The products are preferably prepared by reacting a highly chlorinated long chain aliphatic compound or mixture of such compounds with an aromatic material in such proportions as to theoretically result in di- or tri-substitution of aromatics in the presence of a Friedel-Crafts type catalyst such as aluminum chloride.

The alkyl substituents are preferably derived from petroleum wax, a complex mixture of predominantly aliphatic hydrocarbons having more than 20 carbon atoms to the molecule, averaging about 24 carbon atoms, and the mixture having olefin or the condensation may precede alkylation.

REACTION OF AROMATIC COMPOUNDS WITH CHLORINATED WAX FOLLOWED BY CONDENSATION WITH POLYOLEFINS

The wax-substituted aromatic compounds can be alkylated by reaction with chlorinated wax and purified before further reacting with the polyolefins, but it is preferred to react the chlorinated wax with the aromatic compound in the presence of $AlCl_3$ as catalyst and then introduce the unsaturates directly into the mixture without isolating the wax-substituted aromatic compound. Boron fluoride is also a suitable catalyst in reacting the polyolefins with the aromatic compounds, but it is entirely suitable to utilize the $AlCl_3$ used in formation of the wax-substituted product.

Besides the diolefins such as chloroprene, butadiene, isoprene and 2,3 dimethyl butadiene, natural rubber is a polyolefin suitable for the condensation reaction. In the use of natural rubber, it is necessary to form a solution of the material in a solvent such as tetrachlorethane before addition to the wax-substituted aromatic compound. Otherwise, proper mixing and reaction cannot be effected. The use of other unsaturated compounds such as unsaturated alcohols, unsaturated ketones, tung oil and linseed oil is also contemplated.

EXAMPLE I

*Reaction mixture*

| | Grams |
|---|---|
| Phenol | 55 |
| Chlorinated wax of 20% chlorine content | 200 |
| $AlCl_3$ | 12 |
| Butadiene | 27 |

Petroleum wax of molecular weight of about 350 and ASTM melting point of 126° F. is melted and chlorinated by introducing chlorine at a temperature of about 200° F. until about 20% by weight of chlorine is adsorbed. The phenol is then added, followed by addition of 7 grams $AlCl_3$ at a temperature of about 150° F. with rapid stirring to reduce foaming caused by evolution of HCl. The temperature of the reaction mixture is gradually raised to about 350° F. during a 2-hour period and held at this temperature until the evolution of HCl is completed, which will require about 1 hour. An equal volume of ethylene dichloride is then added to reduce the viscosity of the mixture along with additional $AlCl_3$ (5 grams), followed by introducing butadiene at about 125° F. until the desired amount noted above is absorbed. The reaction product is then purified by washing with water and neutralizing with aqueous ammonia to ensure complete removal of corrosive HCl. The mixture is then steamed to remove the ethylene dichloride whereupon the product becomes coagulated and in this state can be formed into a sheet by running through squeeze rolls. It is desirable to wash the product further in this rolling operation, followed by drying on a heated mill roll to obtain the finished product.

EXAMPLE II

*Reaction mixture*

| | Grams |
|---|---|
| Chlorinated wax of 27% chlorine content | 200 |
| Phenol | 73 |
| $AlCl_3$ | 12 |
| Rubber | 22 |

The chlorinated wax is reacted with the phenol by the procedure above described to form the wax-substituted phenol, diluting the reaction mixture directly after the Friedel-Crafts reaction with 150 c. c. of tetrachlorethane to reduce the viscosity of the mixture. A 5% solution of the rubber in tetrachlorethane is then added along with additional $AlCl_3$ (6 grams) and the reaction mixture is heated at the reflux temperature (285° F.) about three hours to effect the condensation. The reaction product is then water-washed and the solvent removed by steam treating and formed into a sheet as described above.

The foregoing procedures for the reaction of chlorinated wax with phenol and the following condensation with a polyolefin are applicable to phenolic compounds in general. Aromatic hydrocarbons and aromatic ethers are more reactive with chlorinated wax in the presence of $AlCl_3$ as catalyst so that the Friedel-Crafts reaction in this case can be carried out at a lower temperature. In the following examples, benzene is reacted with chlorinated wax in the presence of $AlCl_3$ at a temperature of 150° F.; diphenyl ether is reacted with chlorinated wax at 212° F. The procedure used in the reaction of diphenyl ether with chlorinated wax is applicable to any of the aromatic ethers; with the exception of benzene, it is applicable to any of the aromatic hydrocarbons.

EXAMPLE III

*Reaction mixture*

| | | |
|---|---|---|
| Benzene | grams | 78 |
| Chlorinated wax of 40% chlorine content | grams | 266 |
| Ethylene dichloride | c. c. | 400 |
| $AlCl_3$ (anhydrous) | grams | 27 |
| Butadiene | do | 54 |

The benzene, chlorinated wax and ethylene dichloride are mixed together in a reaction vessel equipped with reflux condenser and stirrer, followed by addition of the $AlCl_3$ at room temperature. The reaction mixture is then heated to about 150° F. and held at this temperature until the evolution of HCl is completed, which will require a reaction period of about 6 hours. Butadiene is then introduced at about 125° F. until the desired amount noted above is adsorbed, followed by water-washing and drying the product according to the procedure outlined above for wax phenol.

EXAMPLE IV

*Reaction mixture*

| | Grams |
|---|---|
| Chlorinated wax of 29% chlorine content | 100 |
| Diphenyl ether | 69 |
| $AlCl_3$ | 10 |
| Butadiene | 25 |

The wax-substituted diphenyl ether is formed by reacting the chlorinated wax with the diphenyl ether in the presence of 4 grams of $AlCl_3$ at a temperature of about 212° F during a 5-hour period, adding an equal volume of petroleum naphtha or a halogenated solvent to reduce the viscosity of the mixture. Additional $AlCl_3$ (6 grams) is then added and the butadiene is introduced at about 125° F. until the desired amount noted above is adsorbed. Water is then added to decompose the aluminum chloride complex and the material is steamed to remove the solvent whereby a product remains which can be milled into a rubbery sheet.

an average molecular weight in the neighborhood of 340. It has been reported that some petroleum waxes contain compounds having as few as 15 carbon atoms, but, in general, the wax mixtures correspond to the above generalization, it being understood that the limit of 20 carbon atoms refers to the characterizing proportion of the mixture with only a small fraction of compounds having a smaller number of carbon atoms; in most cases, a fraction of 1%.

The rubber-like characteristics of the wax-substituted compositions are apparently directly attributable to the wax substituents. When similar alkylated aromatic compounds are prepared from paraffins of lower molecular weight than the wax range as defined above, hard resins of some resiliency are formed, but the flexible, rubber-like properties characterizing the preferred intermediates are lacking. Having aliphatic hydrocarbons of suitable characteristics, further control must be exercised in connection with the degree of alkylation. The proportion of reactants must be one which theoretically will polyalkylate the aromatic compound. The proportion of alkylating agent must be great enough that, if the alkyl groups were uniformly distributed among the aromatic molecules, each of those molecules would receive at least two long chain alkyl substituents as defined above. Preferably the aromatic is tri-substituted, since this degree of alkylation produces superior products.

The aromatic reactant used in forming the new compositions appears to be primarily a nucleus for reception of the wax groups imparting the desired properties to the finished material. Various substituted and unsubstituted aromatic compounds, single ring, polycyclic and compounds such as diphenyl and diphenyl methane are advantageously employed. It is, of course, essential that the aromatic body possess at least 2 unsubstituted carbon atoms in order that the desired substitution of long chain alkyl groups may be accomplished.

The aromatic compounds are not equivalent, however, with respect to the present invention as regards exact proportion of reactants and the degree of chlorination of the wax required to produce compositions of substantially the same properties. As a general rule, products derived from oxyaromatic compounds such as phenol and diphenyl ether, for instance, are more resilient and elastic than those from unsubstituted aromatic hydrocarbons. Aromatics of the monocyclic type require reaction with chlorinated wax of higher chlorine content to form compositions having properties comparable to those of products formed from aromatics of the polycyclic and condensed nuclei types. It must be recognized, of course, that any given aromatic compound may be reacted with chlorinated wax in variable proportions and/or with wax having variable chlorine content (both within the limits defined) to form products varying in elasticity and tensile strength.

We have found that the chlorine content of the wax used in the alkylation reaction is an important factor. The chlorinated wax must have a chlorine content sufficiently high to produce tough compositions. Suitable properties for most purposes appear at a chlorine content of about 25% by weight, although higher degrees of chlorination are found preferable with some aromatic compounds, notably benzene, chlorinated waxes having as much as 50% chlorine content producing good compositions.

The chemical nature of the molecules resulting from the present reactions is, as might be expected, widely varied and extremely complex. A rubber-like composition derived from phenol and 27% chlorwax (petroleum wax chlorinated to 27% chlorine content) in proportions to theoretically trialkylate the phenol contains about 25% phenol, with the remainder of the molecule consisting of combined wax radicals. The compositions reacted with polyolefins according to the invention may be represented by general formulae as set out below, it being understood that these merely represent probable linkages. It is not attempted to accurately depict molecules actually occurring in the complex compositions of the inventions, since these vary widely and very likely include in a single molecule several of the linkages indicated below. For simplicity, the aromatic nuclei are represented uniformly by the phenyl radical.

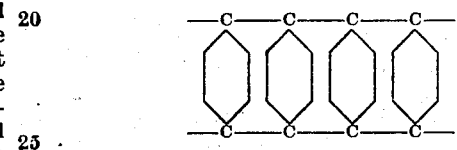

The compositions are represented in the foregoing formula with a single attachment of the aromatic group to each wax group, but in the reaction of chlorwax of high chlorine content with aromatic compounds as carried out in the processes of the invention, apparently the aromatic group will be attached in some cases to more than one carbon of the same wax group, particularly in reactions with aromatic compounds of the condensed nuclei and polycyclic type.

Some chain formation would be expected to occur in the reaction of aromatic compounds with chlorinated waxes, in which case the following representation would be applicable, → representing a continuation of the chain structure.

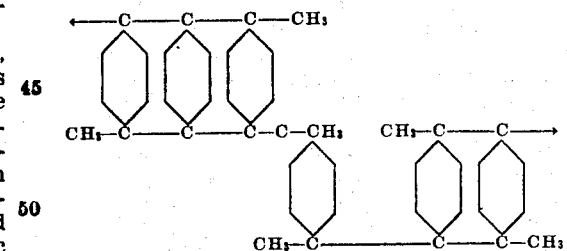

The rubber-like compositions are represented in the foregoing formulae as di-substituted aromatic compounds, but an amount of chlorwax can be reacted with the aromatic compounds sufficient to substitute all the replaceable hydrogens of the aromatic nucleus. Generally, an amount of chlorwax sufficient to at least tri-substitute the aromatic compound is favored. Chlorinated wax of 50% chlorine content can be prepared conveniently. This degree of chlorination of the wax can be used in formation of the rubber-like compositions, but will require the use of a powerful commercial mixer because of the high viscosity of the mixtures obtained. A tough, rubber-like product results in the formation of wax phenol from 27% chlorwax and phenol in proportions for tri-substitution, which can be carried out in ordinary laboratory reactors of glass.

In general two procedures are available for producing the compositions of this invention. The aromatic may be alkylated and the substituted aromatic may be condensed with a poly-

REACTION OF POLYOLEFINS WITH AROMATIC COMPOUNDS FOLLOWED BY CONDENSATION WITH CHLORINATED WAX

The reaction of higher molecular weight wax phenols such as (2-27), (3-25), (3-27), for instance, with butadiene, to produce improved rubber-like compositions cannot be carried out very readily by the foregoing procedure, because of the low solubility of wax phenols of this type in organic solvents, thereby resulting in poor miscibility with the diolefin. To avoid this difficulty the polyolefin can be reacted first with the aromatic compound in the presence of a metal halide such as $AlCl_3$ and $BF_3$, followed by reaction with chlorinated wax to produce the wax-substituted aromatic compounds having rubber-like characteristics. This is illustrated in the following:

Reaction mixture

|  | Grams |
|---|---|
| Phenol | 101 |
| Butadiene | 56 |
| $AlCl_3$ | 11 |
| Chlorinated wax of 27% chlorine content | 282 |

The phenol is melted in a flask and 6 grams of anhydrous $AlCl_3$ are added with stirring. Butadiene is then passed into the mixture at about 125° F. while stirring vigorously until the desired amount of butadiene noted above is adsorbed. The chlorinated wax is then added together with 5 grams of $AlCl_3$ and the temperature of the reaction mixture is raised to about 300° F. After a reaction period of about 1 hour, the mixture becomes too viscous to be stirred, but upon continued heating the mixture can be broken up into small rubbery particles and the stirring resumed. At this point the aluminum chloride complex is decomposed by treating the product with water in the presence of an equal volume of benzene or halogenated solvent. The solvent is then removed by steaming and the rubbery product is milled into a sheet as the finished product. This procedure is applicable to aromatic compounds in general since the polyolefin reaction products are not volatile at the Friedel-Crafts reaction temperature required for the condensation with chlorinated wax.

Without blending with compounding agents or heating with vulcanizing agents, the compositions are elastic when formed from a proportion of chlorwax sufficient to tri-substitute the aromatic compound, such as the wax phenol of Example I. With a lower degree of substitution, the products are less elastic and more resinous, an example of which is the wax phenol of Example III. As the chlorine content of the chlorwax is raised, the products become tougher but retain elastic properties if the proportion of phenol to wax is maintained. As the chlorine content is increased, it is therefore desirable to increase the amount of chlorwax used in the alkylation of the aromatic compound.

The compositions are not readily dissolved in the general line of organic solvents and the solubility becomes less as the degree of chlorination of the wax, from which the products are derived, is increased.

The compositions can be readily milled and compounded with fillers. Rubber is more readily plasticized in the milling operation when admixed with the novel compositions and in combination therewith gives a tough, homogeneous mixture.

Chemically, the wax aromatic compounds are susceptible to reactions which the parent aromatic compounds will undergo, but with formation of products having different physical characteristics. The resistance of the compounds to acids is high as would be expected since the products are formed in the presence of HCl. The compositions have excellent stability against deterioration upon exposure to air, whether in the dark or in the presence of light.

The plastic and rubber-like compositions give tough, adherent films as coating compositions and are particularly valuable for this purpose because of their resistance to cracking and resistance to corrosive acids. The more elastic materials are also valuable as plasticizing agents for brittle coating compositions.

The wax phenol products condensed with polyolefins are desirable as moldable compositions or for incorporation with phenols of low molecular weight to be used in the formation of moldable compositions, with the purpose of plasticizing the materials.

When blended with compounding agents and heated with vulcanizing agents of the type effective with natural rubber, the elastic materials are adaptable to many uses as a substitute for vulcanized rubber.

Although the compositions have been described as formed by a Friedel-Crafts reaction, it will be apparent that other alkylation catalysts and procedures, as well known in the art, may be employed. At the present time, the Friedel-Crafts reaction appears to be most feasible commercially and is preferred.

It will be seen that the invention is equally applicable to the use of pure aromatic compounds and mixtures of aromatics, with or without compounds other than aromatics. The term "aromatic material" is accordingly used in the claim to comprehend these aromatic compositions within the scope of the invention, it being understood that proportions recited relate only to the reactive aromatic compounds and do not include diluents, impurities and the like.

We claim:

A composition of matter formed by heating chlorinated petroleum wax of at least 25% chlorine content with an aromatic material of the group consisting of phenols and aromatic ethers having at least 2 nuclear carbon atoms capable of substitution in the presence of a Friedel-Crafts catalyst and in a mol ratio of combined chlorine to aromatic material not less than two and heating the product thereof with an olefin having conjugate double bonds in the presence of a Friedel-Crafts catalyst.

ORLAND M. REIFF.
JOHN D. ZECH.

CERTIFICATE OF CORRECTION.

Patent No. 2,349,759. May 23, 1944.

ORLAND M. REIFF, ET AL.

It is hereby certified that error appears in the printed specification of the above numbered patent requiring correction as follows: Page 1, second column, line 47, for the word "about" first occurrence, read --above--; and that the said Letters Patent should be read with this correction therein that the same may conform to the record of the case in the Patent Office.

Signed and sealed this 14th day of November, A. D. 1944.

Leslie Frazer (Seal) Acting Commissioner of Patents.